United States Patent [19]

Bradley et al.

[11] 3,933,212

[45] Jan. 20, 1976

[54] WEIGHING APPARATUS

[75] Inventors: Chester D. Bradley, Darien; Malcolm C. Tate, Stamford, both of Conn.

[73] Assignee: The A. H. Emery Company, New Canaan, Conn.

[22] Filed: Nov. 11, 1974

[21] Appl. No.: 522,413

[52] U.S. Cl. .............................................. 177/209
[51] Int. Cl.² ........................................ G01G 5/04
[58] Field of Search ................... 177/126, 209, 254

[56] References Cited
UNITED STATES PATENTS 3,299,976   1/1967   Boadle et al. ................... 177/255 X

FOREIGN PATENTS OR APPLICATIONS 1,060,838   3/1967   United Kingdom ................. 177/209
1,508,241   1/1968   France .............................. 177/126

Primary Examiner—George H. Miller, Jr.
Attorney, Agent, or Firm—St.Onge Mayers Steward & Reens

[57] ABSTRACT

Platform weighing apparatus combines a foundation frame, a two layer platform, and interposed load cells of highly restricted vertical dimensions. The load cells are interfitted within cut-away portions of the underlayer of the platform, being removably attached to the platform, but floating with respect to the apparatus frame. Centering rings on the floating lower portions of the load cells facilitate set-up of the apparatus. The load cells lie wholly below the planar surface of the platform, facilitating attachment of hook-on ramps to the four sides of assembly to make it equally approachable from all sides. Deflectable bracing means prevent relative sideways motion of the platform and frame while permitting vertical weighing motion of the platform.

8 Claims, 10 Drawing Figures

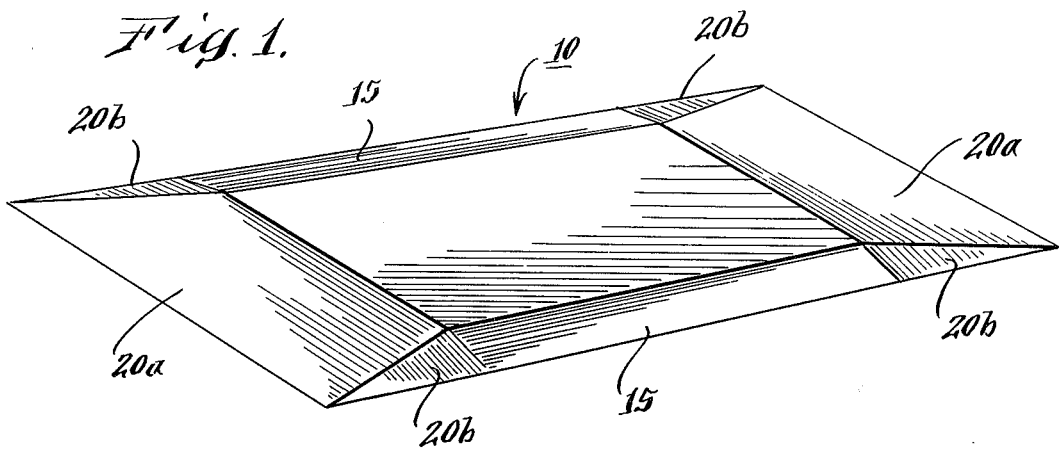
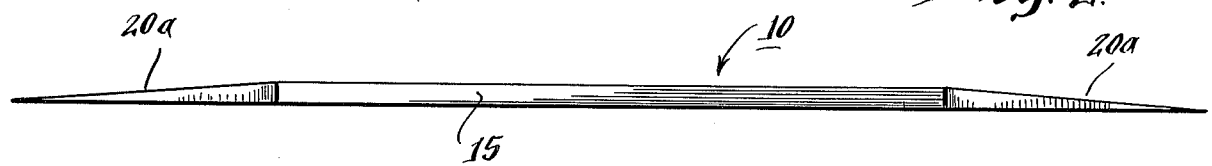
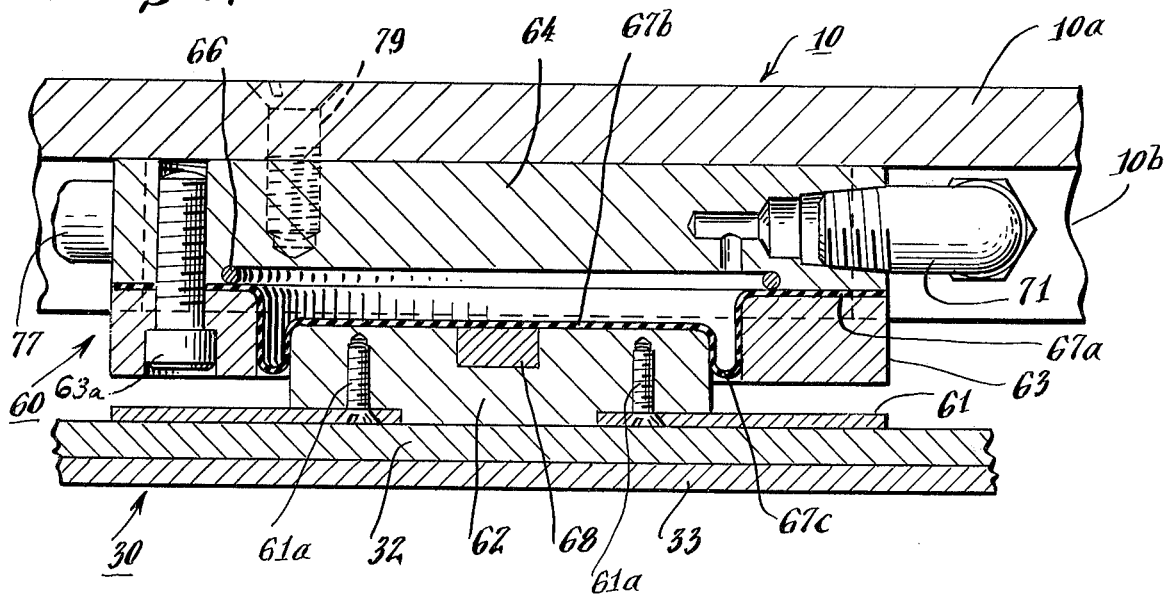
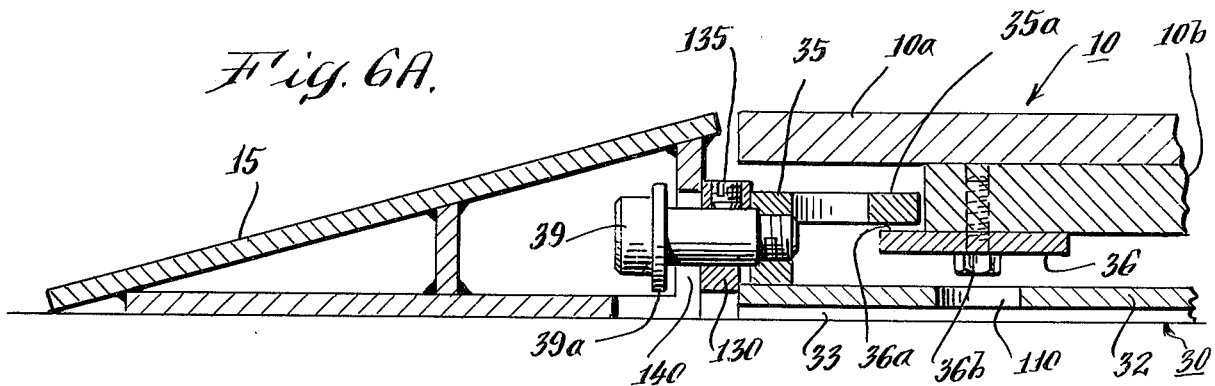

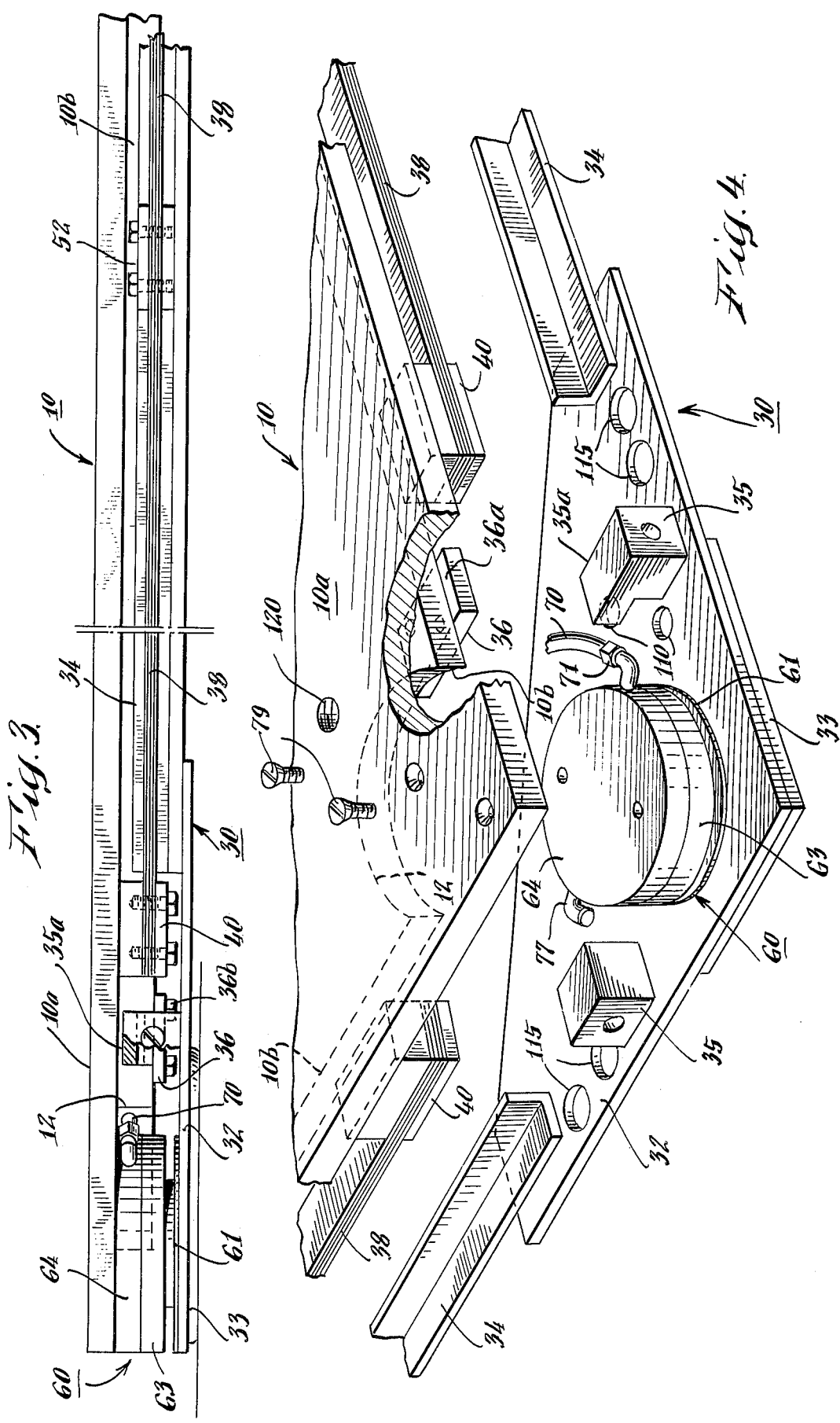

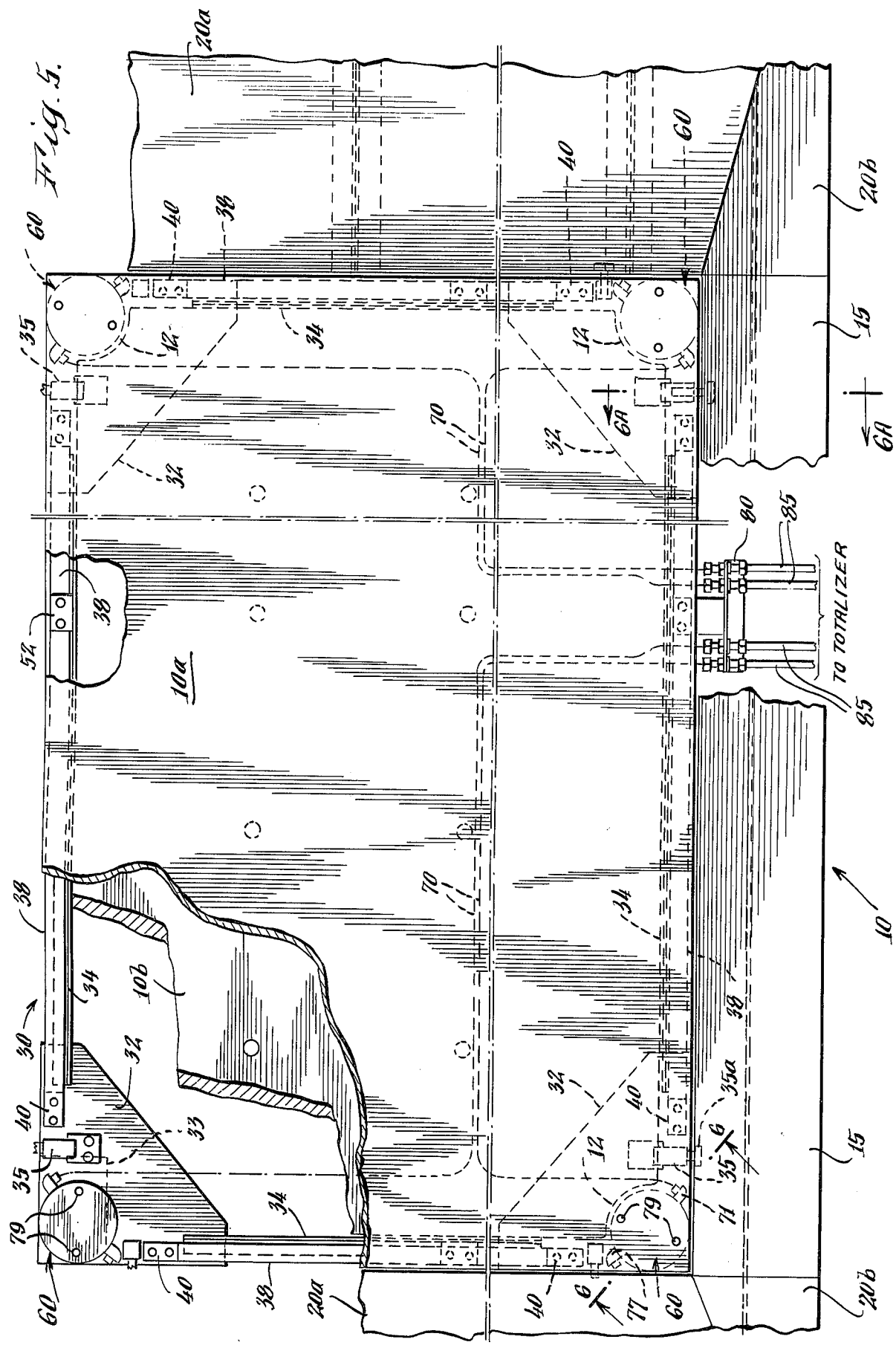

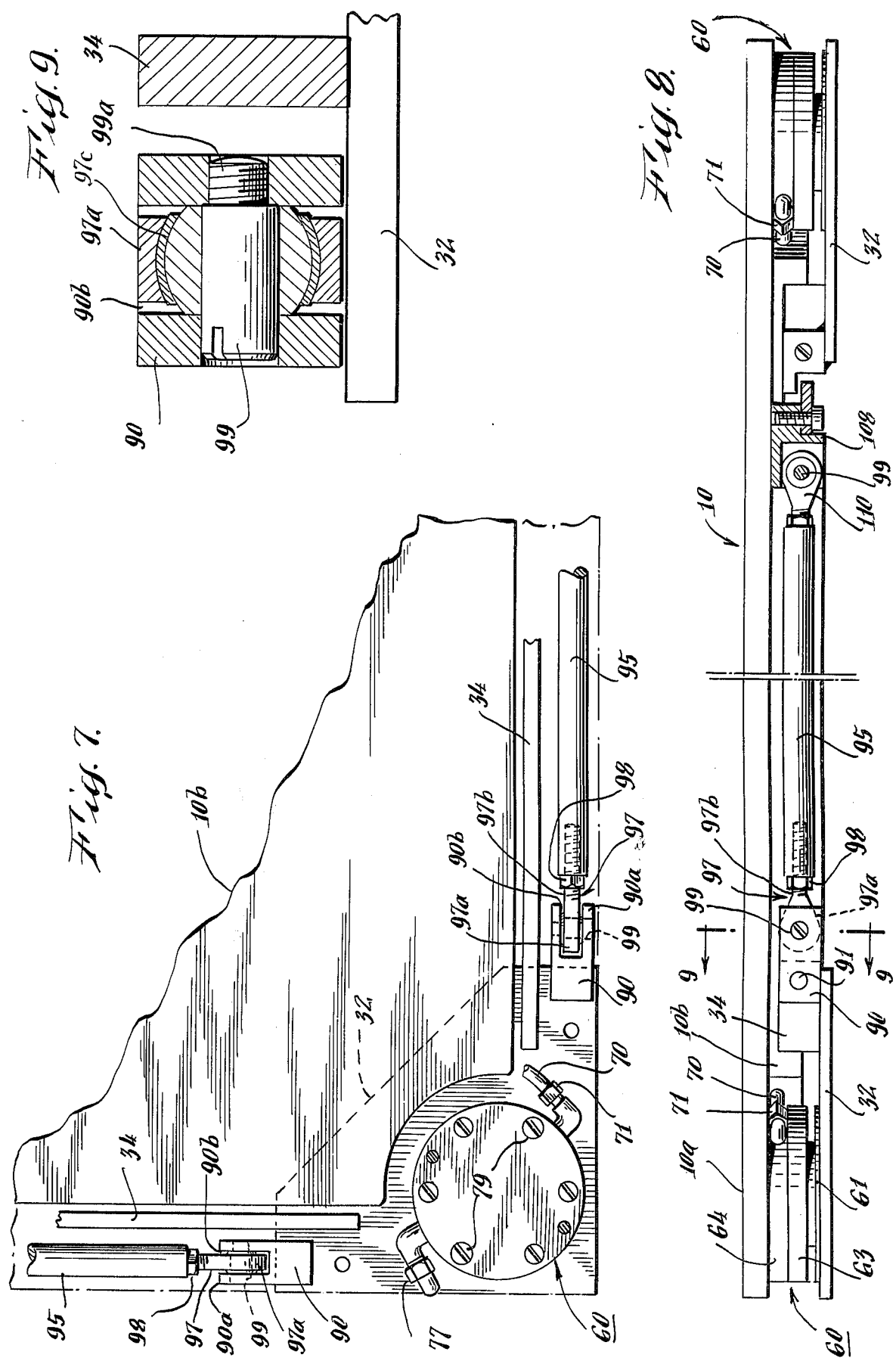

WEIGHING APPARATUS

The present invention relates to weighing apparatus and more particularly to platform apparatus adapted to weigh loads borne by wheeled conveyances such as fork-lift trucks.

This field of application calls for apparatus which is (i) of high weighing capacity, (ii) capable of being moved from location to location as requirements change, (iii) low enough that heavily loaded vehicles may readily ascend to the weighing surface, and (iv) flat enough in respect to its general profile as to create minimum obstruction of the operating area. These qualities appear not to have been previously successfully combined in available equipment.

BACKGROUND AND BRIEF DESCRIPTION OF THE INVENTION

It is the purpose of the present invention to provide an improved weighing apparatus assembly which effectively realizes all the objectives mentioned in the foregoing, while concurrently meeting further objectives of reliability, low cost and easy maintenance, including particularly ready replaceability of functional elements of the apparatus. These objects, as well as others which will appear as description proceeds, are achieved by combining in a novel way an underlying frame structure with a superposed platform structure, the two structures being separated by peripherally located load cells which lie wholly below the surface plane of the platform. The load cells, which, in combination with suitable metering equipment, measure the weight supported on the platform, are so connected to the platform assembly as to be removable by horizontal withdrawal from between the platform and frame structures merely by release of attachment means connected to the platform structure and readily accessible from its upper surface. Moreover, the assembly which accomplishes this is such that its entire horizontal profile lies wholly between planes which in the vertical direction are separated only by a very few inches. This means that the assembly presents little obstruction from any direction of approach, a feature which is taken advantage of in a preferred application of the invention by framing each side of the weighing assembly by a detachable inclined ramp so disposed that the framed assembly presents the aspect of a low level truncated pyramid, conveniently mountable from any side.

Further objects and advantages of the invention will be readily discerned from a consideration of the following detailed description, taken in connection with the accompanying drawings. In the drawings:

FIG. 1 is a perspective view of the fully assembled weighing apparatus;

FIG. 2 is a side view of the apparatus of FIG. 1;

FIG. 3 is a side view (foreshortened by breaking out sections) of the assembly of the platform and frame structures (with ramps removed);

FIG. 4 is an exploded perspective view of a corner of the apparatus assembly (less ramps);

FIG. 5 is a plan view, partially broken away, of the assembly of the frame and platform structures (with ramps attached);

FIG. 6 is a section taken on line 6—6 of FIG. 5;

FIG. 6A is a fragmentary section taken on line 6A—6A of FIG. 5;

FIG. 7 is a fragmentary top view (with the upper platform part removed) showing alternative means of interconnecting the frame and platform structures; and FIG. 8 is an extended side view of the assembly of FIG. 7, with the top platform part in place; and FIG. 9 is a section taken on line 9—9 of FIG. 8.

DETAILED DESCRIPTION OF THE INVENTION

Referring particularly to FIGS. 1 and 2, one sees the external appearance of the completely assembled weighing apparatus with the surrounding ramps in place. The central rectangular surface 10 is that of the weighing platform per se, this being framed by, although not attached to, a set of four ramp parts. The two ramp parts 15 which parallel the longer platform edges comprise, in the embodiment shown, rectangular structural steel panels (preferably embossed or otherwise surface-roughened), each having its lower edge resting on a floor or other substrate (not shown in FIG. 1). The inner edges of these parts are removably attached to and supported by an underlying frame structure which does not appear in FIG. 1 but which will be fully described at a later point. Two additional ramp parts adjoining the ends of platform 10 are provided with central panels 20a (embossed or otherwise roughened) and normally serve as mounting and demounting surfaces for a truck or other vehicle to be weighed on the platform. Inclined wings 20b are welded or otherwise attached to the panels 20a, these wings having a triangular shape chosen to make them abut (in the assembled condition of the apparatus) with the extremities of the side ramps 15. As clearly appears in FIGS. 1 and 2 the resulting configuration of the assembled platform and ramp is that of a very low profile truncated pyramid, with the platform 10 being capable of unobstructed access from any angle of approach.

FIGS. 3, 4 and 6, taken in conjunction, provide details of the apparatus assembly and show that it includes, in addition to the rectangular platform structure 10, a frame or base structure 30 similar in outline to the platform and a number of load cells 60 located between the platform and frame structures near their peripheries. The platform structure is formed of an upper layer 10a, preferably of surface-corrugated structural steel of about ½ inch thickness and an underlayer 10b of structural steel of about ¾ inch thickness. This second layer is provided as reinforcement and may suitably consist of a steel plate of the indicated thickness plug-welded to the upper plate 10a. The horizontal dimensions of the underlayer are a few inches less than those of the upper layer and, as appears most clearly in FIGS. 4 and 5, the underlayer is cut away at its corners to provide curved recesses 12 in which the load cells 60 may be located. It will be understood, of course, that the entire platform structure could alternatively be formed of a single relatively thick plate with the corners of the underside of the plate milled away to a depth appropriate to provide recesses similar to the illustrated recesses 12.

The underlying frame structure 30 is provided at its corners with generally triangular foundation plates 32, these being backed up by underlying bearing plates 33. These various plates are formed of an appropriate structural material (e.g. steel) and the bearing plates 33 provide flat surfaces for supporting the entire weighing assembly on a level substrate such as a factory floor or, if outdoors, a concrete base. Spacers 34 of suitable gauge strap or angle iron are welded at their extremities to the foundation plates 32 to establish a rigid rectangular assembly of the frame structure as shown in FIGS. 4 and 5.

It is important that the platform structure be capable of limited vertical movement in relation to the frame structure (i.e. in order to perform its weighing function) but that horizontal relative movement of the two structures be susbstantially prevented. This relationship is established in connection with the present invention by providing near each edge of the assembly a mechanical linkage between the platform and frame which has flexibility in the up and down direction but which is essentially unyielding in the horizontal plane. In the preferred construction of FIGS. 1 through 6, the appropriate linkage is supplied by assemblies or bundles 38 of thin flexible strips extending along the various edges of the platform structure, with the principal dimensions of the several strips lying in (or approximately in) the horizontal plane. Each bundle has at each end a fixed clamped connection 40 to a near-corner portion of the underside of the upper platform part 10a and at its center a fixed clamped connection 52 to a near central portion of the appropriate one of the frame-forming spacers 34. Each edge of the platform-frame thus has, in effect, two stabilizing stay-strip assemblies in end-to-end relation, each assembly being free, by virtue of its laminated construction, to flex readily in the vertical direction so as to permit substantially unrestrained up-and-down motion of the platform 10. On the other hand, any attempted horizontal motion of the platform in relation to the base structure 30 (FIG. 3) will place one or more of the strip assemblies in tension, a condition in which horizontal platform movement will, to all intents and purposes, be precluded. Placing any one of the strip assemblies in tensile stress will in theory, tend to place its paired assembly in compressive stress. However, the tensile strength of the strip materials employed is so great that actual compression of the paired strips will be inconsequential, and in no event great enough to cause their buckling or other destructive distortion. In a particular case, it has been found entirely effective to form each strip bundle of a set of four stainless steel strips, each 1 inch wide and 1/16 inch thick. However, depending on projected loading, more strips may be employed, or the sectional dimensions may be varied as required.

In the weighing system employed in the present invention, there are interposed between the platform structure 10 and the frame or base structure 30, a set of hydraulic load cells 60. These are preferably located under the corners of the weighing platform. As is well known in the art, placing a weight on the platform applies compressive force to the fluid contained in the load cells, and the summation of the pressures developed in the several cells provides an evaluation of the total weight applied. Such summation may be accomplished in a conventional way through pipe lines 70 leading from the various cells to an externally accessible junction station, as indicated for example by number 80 in FIG. 5. From the junction station, the several pipes 70 may be connected through further ducts 85 to an integrating instrument or totalizer. This instrument is not illustrated in the drawings but may be of any well-known type.

The present invention is not concerned with the internal structure of the load cells 60 per se, since the general theory of such cells is already well known. It is, however, concerned with the way in which the cells are interrelated with the remainder of the weighing assembly to realize a new order of vertical compactness and new degrees of facility in aligning the functional parts of the weighing apparatus in a field location. For explanation of this aspect of the invention, reference may be had to FIGS. 3 through 6.

As has already been noted, each of the load cells 60 is centered within a cut away portion 12 of the underlayer 10b of the platform structure (FIGS. 4 and 5). Within this cut away region the cell's upper planar surface abuts against a downwardly directed surface area of the platform's upper layer 10a, while its bottom planar surface faces an upwardly directed surface area of the underlying frame. In the construction illustrated, the last-mentioned surface area is the upper face of one of the triangular corner pieces 32. Each cell is circular and has a major dimension (e.g. 1-¼ inches) in the vertical direction which is a minor fraction of its major dimension (e.g. 5 inches) in the horizontal direction. For this reason, and by virtue of the fact that the various cells "by-pass" the relatively thick underlayer of the platform structure (i.e. because of their location within the cut-out regions of that layer) the elevation above the factory floor (or other substrate) of the upper surface of the weighing assembly can be kept at about 2 inches, or less than twice the vertical dimension of the load cell alone. This is of enormous advantage to the user since it maximizes ease of mountability for fork-lift trucks and similar conveyances and minimizes obstruction of the factory floor (or other working surface) regardless of the direction of approach.

Further advantages in terms of ease of assembly and alignment of a weighing station and repairability of an installed system are realized by attaching each load cell only to the platform structure and by making this attachment by means which are accessible from the upper surface of that structure. This feature is illustrated in FIG. 6, taken in connection with FIGS. 4 and 5. Referring to FIG. 6, the load cell illustrated is of the same operational character (although not of precisely the same structural configuration) as that shown and described in U.S. Pat. No. 2,960,113 issued Nov. 16, 1960, which patent is hereby incorporated by reference. For purposes of the present invention, the cell comprises a cylindrical upwardly directed piston 62 which is surrounded by a flat centering ring 61 secured to it by bolts 61a. The piston is loosely enclosed by an annular collar 63, which in turn is backed up by a cylindrical pressure plate 64. A set of bolts 63a (only one being shown) secure the collar to the pressure plate, a fluid-tight seal being assured by use of an O-ring 66. A cup-shaped flexible diaphragm, preferably formed of impervious pliable plastic material, includes an outer flange 67a which is clamped between the collar 63 and the pressure plate 64. The central portion of the diaphragm depends in cup-like fashion from the flange to provide (i) a flattened circular part 67b which lies on the upper surface of the piston 62 (being centered thereon by an attached centering button 68) and (ii) an annular depending loop or fold 67c which falls in the space between the opposed lateral walls of the piston and the collar 63. The diaphragm thus constitutes a friction-free hydraulic seal for the space between the piston and the pressure plate 64.

At its periphery each loaded cell is provided with an outlet from the space between the piston and the pressure plate which terminates in a connector 71. This connector serves to attach the outlet to piping 70 (FIG.

4) through which the fluid pressure developed by loading the weighing platform can be transmitted to an appropriate measuring instrument or totalizer, as previously described. It is found convenient also to use the several branches of the piping 70 at the point of their junction with the totalizer as a means for injecting into the several cells (i.e. through their respective connectors 71) the pressurized hydraulic fluid upon which the functioning of the system depends. To facilitate this filling operation, each cell is additionally provided with a vent-fitting 77 by which trapped air may be released from the cell as pressurized hydraulic fluid is introduced. Although other arrangements are possible, in the particular construction illustrated the vent-fittings 77 and the outlet connectors 71 are displaced from one another about 180° around the circumference of the load cells.

It should also be noted that only the pressure plate 64 of each cell is attached to the structure of the weighing assembly, the lower surfaces of the piston cylinder 62 and the centering ring 61 being left free of attachment to the underlying frame parts 32, although under load they will bear upon and be pressed against these parts. The preferred mode of mounting the cell involves the use of removable securing means accessible from the upper surface of the platform part 10a. This, as shown in FIG. 4, these means may consist of screws 79 which pass downwardly through the platform into threaded opening provided in the pressure plate 64. This mode of single-side attachment eliminates the need for special access structures to be provided above the surface of the platform for installing and servicing the load cells. Furthermore, it simplifies the process of aligning the cells at the time of final assembly of the weighing apparatus in that the various centering rings 61 can readily be checked at their edges for alignment with the similarly dimensioned edges of the superposed cell parts 63 and 64. Any misalignment detected can be corrected by somewhat lessening the weight bearing on the upper cell surface and sliding the centering ring to a properly aligned position — no disassembly of parts being required for this operation.

Another feature of the apparatus which should be noted comprises the means provided for simultaneously lifting the platform and underlying frame structures (once these two structures are combined in their final or near-final assembly). These means include the provision near each end of the frame structure of a fixed block 35 (FIG. 4) which has an inwardly directed lip portion 35a. When the platform 10 is finally installed, the lip portion 35a overhangs the upwardly directed surface of a retaining block 36 which is attached to the underside of the platform part 10b, extending beyond the edge of that part as clearly indicated at 36a in FIG. 4. Access openings 110 provided in the frame parts 32 permit attachment and removal of the retaining blocks 36 by means of bolts 36b (FIGS. 3 and 6a). Similar access openings 115 facilitate bolted attachment of the clamping blocks 40. For lifting the entire assembly once its upper and lower parts are loosely interlocked in the manner just described, use is made of threaded lift holes 120 provided in the upper surface of the platform part 10a. These holes may be closed by a screw-in plug (not shown) when the apparatus is ready for use, but can be reopened and fitted with eye-bolts when a lifting operation is to be performed.

The uniquely streamlined, low-profile configuration of the entire weighing apparatus which results from the features of the invention described above also establishes the omni-directional approachability of the weighing surface which already has been mentioned in connection with FIG. 1. That is to say, this configuration makes practical the four-sided ramp assembly which FIG. 1 illustrates. More specifically, it is found readily possible, in accordance with the invention, to provide for field attachment to the frame structure 30 (FIG. 6A) of four cooperatively formed ramp parts which, in combination with the upper platform surface, produce the aspect of a low-lying truncated pyramid presenting a substantially unobstructed path of approach from any angle. Relevant details of the ramp-attaching means are shown in FIGS. 4 and 6A from which it will be seen that the triangular frame members 32 are provided at each of their orthogonal edges with upstanding bolt-receiving brackets 35 (some of these brackets also serving an interlocking function as just explained). In use, each bracket is equipped with a bolt 39 (FIG. 6A) having at its head portion a widened flange 39a, the bolt being of such length that the flange is significantly spaced from the nearest face of the backet. Locking means comprising the combination of a thickened washer 130 having a no-turn engagement with the face of the bracket and a set-screw fixedly securing the washer to the shaft of the bolt 39 holds the bolt in place once all its associated elements have been properly tightened. With this arrangement the several bolts provide latch-on means adapted to engage the upper lips of downwardly directed slots 140 provided in the ramp structure as exemplified in FIG. 6A.

The preferred means illustrated in FIGS. 1 through 6 for securing the platform and frame structures against excessive relative horizontal movement are, of course, capable in some circumstances of replacement by other securing arrangements. A particular alternative arrangement which is advantageous from the standpoint of field assembly is illustrated in FIGS. 7, 8 and 9. (In these Figures, parts which have already been fully identified bear identical numbers to those previously used.)

Referring only to the novel details of FIGS. 7, 8, it will be seen that the generally triangular frame 32 has affixed to its corner extremities (e.g. by welding) a pair of brackets 90 each of which is adapted to serve both as an attachment for a ramp part and as securing means for a cylindrical bracing arm 95. Attachment of the ramp part may be accomplished by a bolt extending into the threaded opening 91, in analogy with the procedure previously described. In addition, however, the bracket 90 has at one end 90a a vertical slot 90b which is sized to receive the bearing end 97a of a coupling member 97 attached to one end of one of the bracing arms 95. Opposite its bearing end, each coupling member terminates in a threaded portion 97b, which, as the drawing shows, enters an appropriately threaded opening in the end of the bracing arm, a back-up nut 98 serving to prevent rotation of the coupling member once it has been adjusted to a preferred axial location. At its bearing end, each coupling incorporates a spherical bearing of well-known kind, as indicated at 97c. In assembling the coupling member 97 with the bracket 90, a bearing pin 99 which has a threaded end portion 99a is inserted through a conforming opening formed in one side of the bracket, thence through a similarly sized opening in the bearing assembly 97c, and then is screwed tightly into a threaded opening in the opposite side of the bracket. With the assembly just described, each of the bracing arms is left free for limited vertical and tortional rotation about the theoretical center of the associated bearing 97c.

The bracing arm 95 extends along the entire side of the weighing assembly and at the end of the arm which is remote from that described in the preceding paragraph is coupled to a bracket 108 on the underside of the platform structure by a coupling member 110 generally similar in construction and mode of attachment to the member 97. Similar arms, similarly attached, are provided on all four sides of the weighing assembly. Each arm acts both in tension and compression to prevent significant horizontal movement of the platform in relation to the frame structure while permitting free vertical movement to the extent required to enable the load cells 60 to function in the intended manner. Such horizontal motion as may occur because of vertical rotation of the arms 95 caused by depression of the platform under load will be trivial because of the extreme smallness of the vertical excursion of the platform permitted by the load cells. In no event (within the load rating of the system) will enough horizontal motion occur to interfere with normal load cell operation.

While the invention has been described only in reference to a particular embodiment thereof, it will be understood that numerous variations may be made within the skill of the art and without departure from the invention.

What is claimed is:

1. Weighing apparatus comprising
  A. a platform structure having a planar upper surface;
  B. a frame structure wholly underlying the surface plane of the platform structure; and
  C. a plurality of mutually displaced hydraulic load cells interposed between downwardly directed surface areas of the platform structure and upwardly directed areas of the frame structure for conjointly measuring, by their compression between the two structures, the total weight of a load placed on the upper platform surface, each of said load cells
    i. being free from attachment to the frame structure; and
    ii. having a positive attachment to the platform structure.

2. Weighing apparatus according to claim 1 in which the load cell attachment to the platform structure comprises removable means which are removable by access to the upper surface of the platform structure.

3. Weighing apparatus according to claim 1 in which each of said load cells has
  A. an upper part attached in face-to-face relation with a downwardly directed surface area of the platform structure;
  B. a lower part having limited freedom of motion in both vertical and horizontal directions with respect to the said upper part and arranged in unattached face-to-face relation with an upwardly directed surface area of the frame structure; and
  C. A centering ring symmetrically attached to the said lower part and having lateral dimensions matching those of the upper part for facilitating alignment of the two parts during assembly of the apparatus.

4. Weighing apparatus according to claim 1 in which
  A. the platform comprises an upper part constituted of a top layer of structural material and a lower reinforcing part constituted of a second layer of structural material, said second layer being cut away at peripheral regions corresponding to the respective locations of the various load cells; and
  B. each of the load cells
    1. having a major dimension in the vertical direction which is a minor fraction of its major dimension in the horizontal direction, and
    2. interfitting between the frame structure and the top layer of the platform structure within one of the said cut-away regions of the second layer of the platform structure.

5. Weighing apparatus according to claim 1 in which
  A. the frame structure is formed to be supported upon a level substrate;
  B. the height of the upper platform surface above the substrate is less than twice the vertical dimension of a load cell; and
  c. the entire periphery of the frame is surrounded by an inclined ramp extending upwardly from the level of the substrate to a height at the region of its contiguity with the frame which coincides with the height of the upper platform surface.

6. Weighing apparatus according to claim 5 in which the platform and frame structures are rectangular and in which the ramp consists of four separable ramp parts, each detachably engaged with a corresponding side of the frame structure, the four ramp parts forming with the upper surface of the platform a low profile truncated pyramid.

7. Weighing apparatus according to claim 1 in which the platform and frame structures are rectangular and which further includes at each edge of the frame structure elongated bracing means extending between a fixed point on the frame structure and a horizontally displaced point on the platform structure for resisting horizontal displacement of the platform structure while permitting vertical movement of that structure.

8. Weighing apparatus according to claim 7 in which each bracing means includes a bundle of thin flexible strips, each strip having its major dimensions in the horizontal plane and each bundle having
  A. a fixed connection at one end to a near-central edge portion of the frame structure; and
  B. a fixed connection at the other end to a near-corner region of the platform structure;
there being at each edge of the frame structure strip-bundles of the specified type extending between the near-central portion of that edge and each of the two associated near-corner regions of the platform structure, whereby attempted horizontal movement of the platform structure places one of said bundles in tensile stress without subjecting the other bundle to destructive compressive stress.

* * * * *